W. H. HOLTBY.
TIRE REST.
APPLICATION FILED MAR. 7, 1914.

1,132,477.

Patented Mar. 16, 1915.
2 SHEETS—SHEET 1.

WITNESSES

INVENTOR
Wilkie H. Holtby
BY
ATTORNEYS

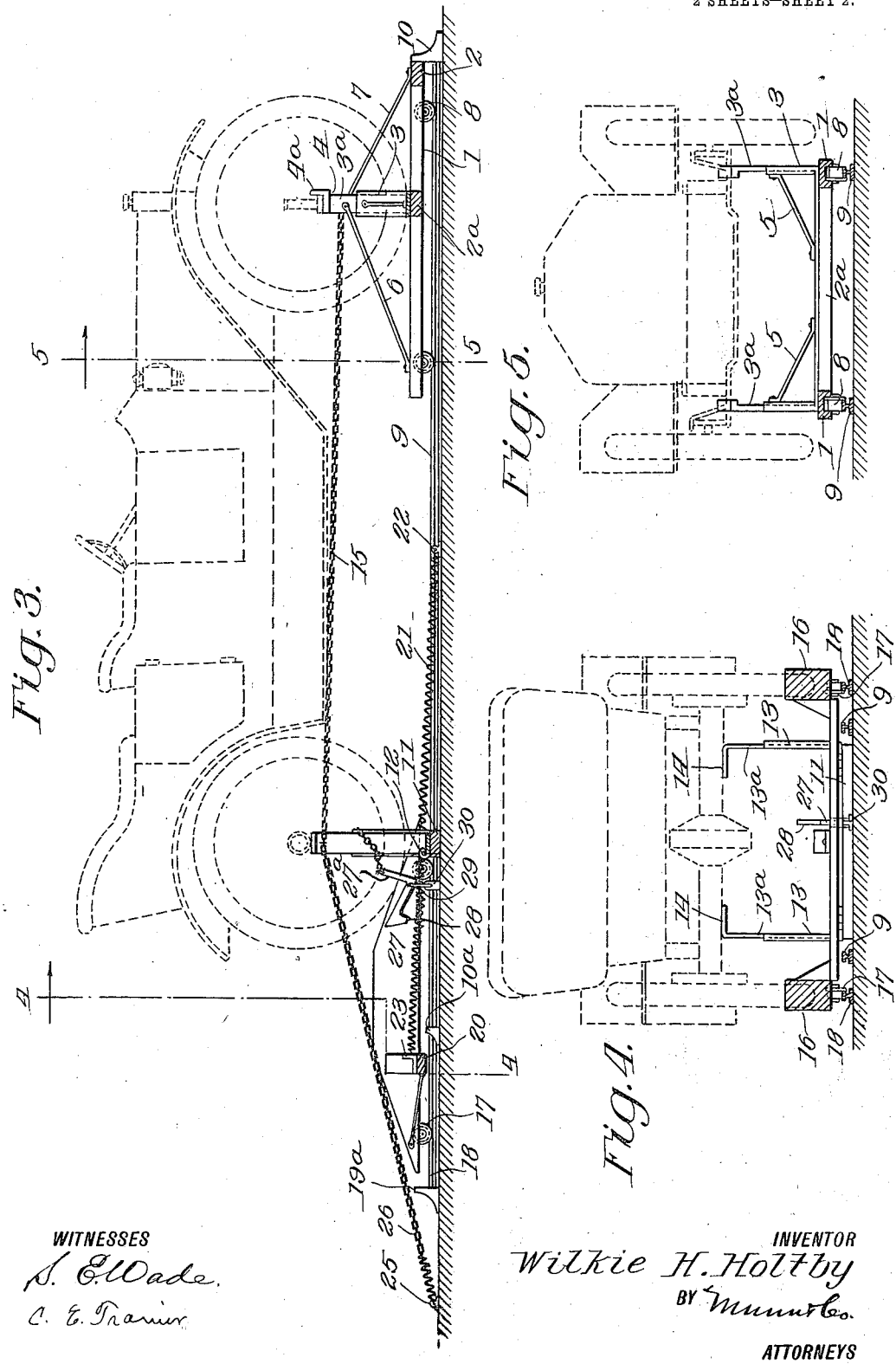

UNITED STATES PATENT OFFICE.

WILKIE HORATIO HOLTBY, OF HOBART, OKLAHOMA, ASSIGNOR OF ONE-HALF TO R. M. SIMMONS, OF HOBART, OKLAHOMA.

TIRE-REST.

1,132,477. Specification of Letters Patent. Patented Mar. 16, 1915.

Application filed March 7, 1914. Serial No. 823,180.

*To all whom it may concern:*

Be it known that I, WILKIE H. HOLTBY, a citizen of the United States, and a resident of Hobart, in the county of Kiowa and State of Oklahoma, have invented a new and useful Improvement in Tire-Rests, of which the following is a specification.

My invention is an improvement in tire rests, and has for its object to provide a support for an automobile or like vehicle, provided with rubber tires for holding the vehicle in elevated position with the tires out of contact with the supporting surface for the vehicle, and wherein a carriage is provided having means for supporting the front axle and movable on a trackway, and wherein a second carriage is provided having an approach for lifting the wheels to permit the front axle to be engaged by the supporting means on the first-named carriage, and wherein a support is provided for the rear axle normally in inoperative position and adapted to be moved into operative position by the first-named carriage to receive the rear axle as the rear wheels pass off the approach, and wherein other mechanism is provided for holding the approach in contact with the rear wheels to permit the vehicle to be moved off and on to the support under its own power.

Figure 1:
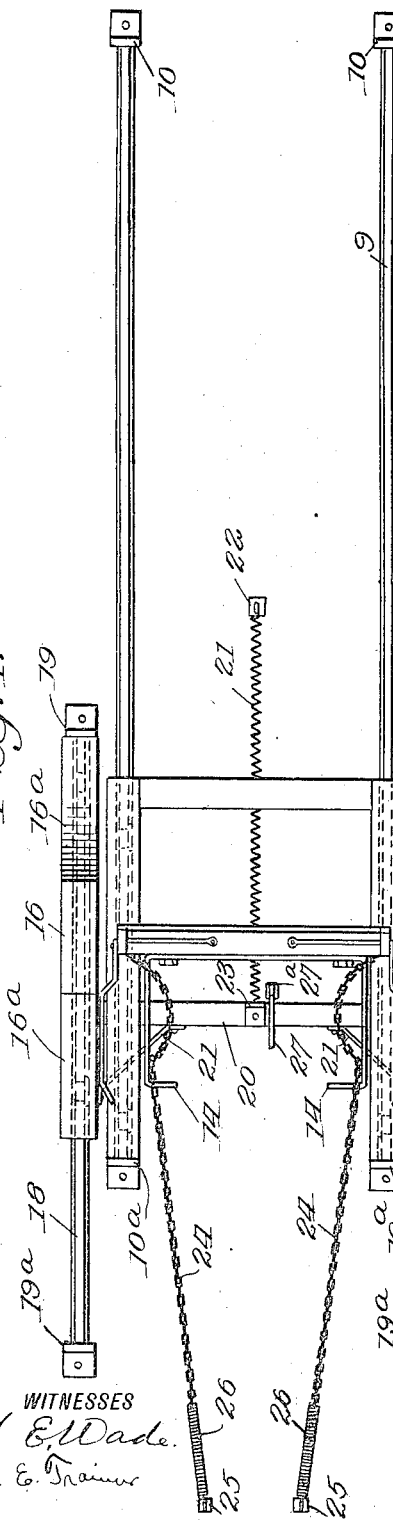
Figure 2:
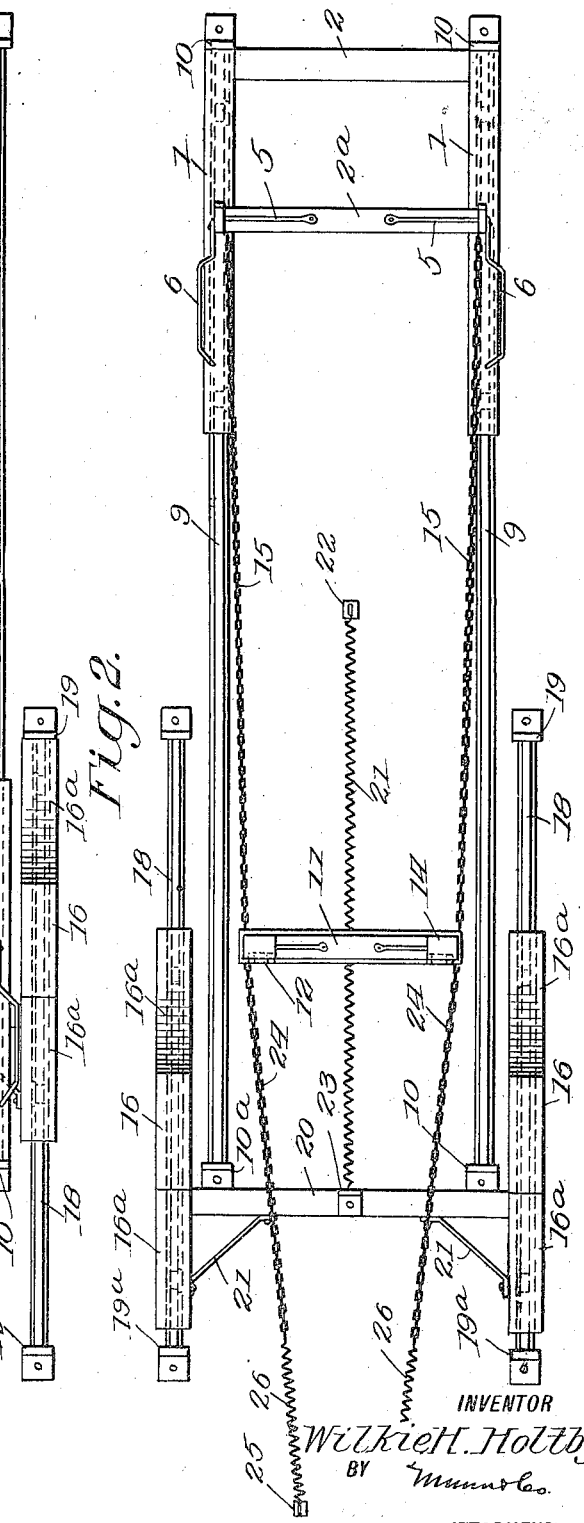

In the drawings: Figure 1 is a top plan view of the improved rest with the parts in position to receive the vehicle, Fig. 2 is a similar view with the parts in position for supporting the vehicle, Fig. 3 is a longitudinal vertical section of Fig. 2, and Figs. 4 and 5 are sections on the lines 4—4 and 5—5, respectively, each looking in the direction of the arrows adjacent to the line.

The present embodiment of the invention comprises a truck or carriage of substantially U-shape, and comprising side bars 1 and cross bars 2 and 2ª, the bar 2 connecting the front ends of the bars 1 and the bar 2ª connecting the said bars intermediate their ends.

Sectional supports or standards are arranged on the side bars 1 at the cross bar 2ª, each of the said supports consisting of a lower section 3 and an upper section 3ª, mounted to slide in the lower section and having at its upper end a rest 4, for engaging the front axle. Each rest is provided at its front with an upstanding stop 4ª for a purpose to be presently described, and the sections are held in adjusted position in any desired manner.

The supports 3—3ª are braced against the cross bar 2ª, by means of inclined braces 5 and against the bars 1, by inclined braces 6 and 7, and flanged wheels 8 are provided for supporting the truck or carriage on rails 9, the said rails being spaced apart and parallel as shown, and supported on the floor of the garage or other building in which the improved rest is arranged. Stops 10 and 10ª are arranged at the opposite ends of the rails for limiting the movement of the truck or carriage.

A rear axle support is arranged at the proper distance from the stops 10 to permit the rear rest to engage the rear axle when the front axle of the vehicle is supported by the front rests with the front truck or carriage in engagement with the stops 10. The said rear rest comprises a cross plate 11, which is hinged to the floor of the garage, as indicated at 12, for swinging movement into the upright position of Fig. 3, or into the horizontal position of Fig. 1.

A sectional standard is arranged at each end of the cross bar, each standard comprising a lower section 13 and an upper section 13ª, mounted to slide in the lower section and having at its upper end an inwardly extending angular lug 14, for engaging beneath the rear axle of the vehicle to be supported. The sections 13—13ª of the standards are held in adjusted position in any desired manner, and the upper section of each rest is connected to the adjacent rest of the front truck or carriage by means of a flexible connection 15, a chain in the present instance. The chains 15 are of such length that when the front truck or carriage is in engagement with the stops 10 of the trackway, the rear rest will be in operative position, that is, with the standards in vertical position.

An approach is provided for lifting the wheels of the vehicle on to the respective rests, and the said approach comprises rails 16, each of which is beveled at its ends as indicated at 16ª, forming thus an incline at each end of each rail. The rails are supported by flanged wheels 17, which run upon rails 18, secured to the floor of the garage and provided at their front and rear ends with stops 19 and 19ª, respectively. The rails are connected near their rear ends by means of a cross bar 20, and inclined braces 21 are arranged between the cross bar and the rear ends of the rails. A coil spring 21 has one end connected to a bracket 22, secured to the floor of the garage, and the other end of the spring is connected to a bracket or angle plate 23, secured to the center of the cross bar 20.

Flexible members 24, chains in the present instance, are connected with the upper sections of the standards 13—13ª, at the opposite side from the flexible members 15, and the rear end of each chain is connected to a bracket 25, secured to the floor of the garage in rear of the rear ends of the rails 18, and a coil spring 26 is interposed between the rear end of each chain and the adjacent bracket 25. The chains 24 may, if desired, be continuous of the chains 15, or they may be separate as may be found most convenient.

A latch in the form of an angle bar is supported in rear of the rear rest, the said latch comprising an arm 27, having a catch 28 at its outer end, and an arm 27ª extending at an acute angle to the arm 27. The latch is pivoted to one end of a loop 29, whose other end is journaled in a bearing lug 30 on the floor of the garage. The arm 27 of the latch is designed to engage over the cross bar 20 of the approach or rear carriage, under conditions to be later described, and the arm 27ª of the latch is connected to the cross plate 11, by means of a flexible connection 31 in such manner that when the rear rest is swung into upright position, the latch will be moved in a direction to disengage the catch 28 from the cross bar 20 to release the approach from the latch.

The operation of the device is as follows: With the parts in the position shown in Fig. 1, that is, in position to receive the automobile, the automobile is run upon the approach, the front wheels passing up the rear incline 16ª. As the front wheels pass upon the highest portion of the rails, the front axle will engage the upstanding lugs 4ª of the front standards on the front truck or carriage, and as the front wheels move forwardly they will pass off the approach, passing down the forward incline of the rails, and the axle will rest upon the rests 4 at the upper ends of the standards. As the vehicle moves, the front truck or carriage supporting the wheels out of contact with the floor of the carriage, will be moved toward the stops 10, and just as the said front truck or carriage comes into engagement with the said stops, the rear rest will be swung into operative position, with the rear standards 13 and 13ª in vertical position. As the rear rest is so swung, the flexible connection 31 between the rear rest and the latch will be tightened to swing the latch lever 27—27ª in a direction to cause the catch 28 to disengage from the cross bar 20 of the approach, and as the rear wheels are rotating, the approach will be moved rearwardly out from under the said wheels, and the rear end of the vehicle will move gradually and easily downward until the rear axle rests upon the lugs 14 of the rear standards. This movement of the rear carriage or support tensions the spring 21, which is just strong enough to move the rear carriage or approach forwardly until the forward inclines 16ª just contact with the tires at the rear of the rear rest. The spring 21 normally holds the rear carriage or approach in contact with the stops 19, that is, in the position of Fig. 1. In this position, the highest portion of the rails 16 of the approach are in register with the rear standards. Until the rear rest is in position to receive the rear axle, the approach is held in such position, the latch being released at the very moment that the standards come into contact to receive the axle, and as soon as the latch is released, the rotation of the rear wheels moves the approach out rearwardly from beneath the wheels, permitting the wheels to move down the forward inclines 16ª until the rear axle engages the lugs 14 of the rear rest. When it is desired to run the vehicle out of the garage and off of the rest, the engine is started with the transmission in the reverse motion. As the rear wheels rotate they draw the approach forwardly, and the wheels move up the forward inclines 16ª until they reach the highest portion of the rails, and the axle is thus lifted out of engagement with the rear standards. The approach can move only until the front end thereof engages the stops 19, and as soon as this occurs (or even before), the vehicle begins to move rearwardly, the front truck or carriage moving rearwardly also, and the springs 26 swing the rear rest downward into the position of Fig. 1. The rear wheels pass off the approach, and the vehicle continues to move until the front wheels engage the front inclines of the approach, at which time the said wheels begin to move up the approach, lifting the front axle from the front standards. As soon as the front wheels have passed rearwardly from off the rails of the support, the spring 21 will draw the approach forwardly until the latch 27—27ª engages the cross bar 20, as shown in Fig. 1. The parts are now in position to again receive the vehicle. The device is entirely automatic in its action, requiring no attention on the part of the operator, and when the car is so supported, a large portion of the wear upon the tires is eliminated.

I claim:—

1. In combination, a trackway, a carriage or truck movable on the trackway, said carriage having extensible and contractible standards for engaging the front axle of a vehicle for supporting the wheels out of contact with the supporting surface for the trackway, a support for the rear axle comprising a cross plate hinged to the supporting surface of the trackway and having extensible and contractible standards for engaging the rear axle and mounted to swing away from the front truck or carriage into horizontal position or into vertical position, a flexible connection between each front standard and the adjacent rear standard for holding the rear standards in vertical position beneath the rear axle when the front standards are in engagement with the front axle, each of the front standards having an upstanding lug for engagement by the front edge of the front axle, an approach comprising spaced rails for engagement by the wheels of the vehicle, each rail being beveled at its ends, a connection between the rails, a trackway, wheels on the rails for engaging the trackway, resilient means normally drawing the approach toward the front truck, a latch adjacent to the rear rest for engaging the approach, to hold the approach with the highest portions of the rails in register with the standards of the rear rest, a connection between the rear rest and the latch for releasing the latch when the rear rest is in vertical position, and resilient means normally acting to draw the rear rest into inoperative position.

2. In combination, a front carriage provided with extensible and contractible rests for engaging the front axle of a vehicle to support the wheels out of contact with the supporting surface for the vehicle, a trackway for the carriage, stops at the ends of the trackway for limiting the movement of the carriage in either direction, a support for the rear axle hinged to swing toward and from the front carriage into and out of operative position, said rear support being extensible and contractible, a connection between the front carriage and the rear support for moving the rear support into operative position when the carriage engages the stops at the forward end of the trackway, an approach comprising spaced parallel rails having beveled ends upon which the wheels are adapted to run to lift the axles on to the supports, a trackway for the approach, stops at the forward end of the trackway for limiting the movement of the approach forwardly to a position with the highest portion of the rails in register with the rear support, a spring normally acting to move the approach forward, latch mechanism for locking the approach in said position, a connection between the rear support and the latch mechanism for releasing the same when the said support is in operative position, and normally active means for swinging the rear support into inoperative position.

3. In combination, a front carriage provided with rests for engaging the front axle of a vehicle to support the wheels out of contact with the supporting surface for the vehicle, a trackway for the carriage, stops at the ends of the trackway for limiting the movement of the carriage in either direction, a support for the rear axle hinged to swing toward and from the front carriage into and out of operative position, a connection between the front carriage and the rear support for moving the rear support into operative position when the carriage engages the stops at the forward end of the trackway, an approach comprising spaced parallel rails having beveled ends upon which the wheels are adapted to run to lift the axles on to the supports, a trackway for the approach, stops at the forward end of the trackway for limiting the movement of the approach forwardly to a position with the highest portion of the rails in register with the rear support, a spring normally acting to move the approach forwardly, latch mechanism for locking the approach in said position, a connection between the rear support and the latch mechanism for releasing the same when the said support is in operative position, and normally active means for swinging the rear support into inoperative position.

4. In combination, a carriage having supports for the front axle of the vehicle for supporting the wheels thereof out of contact with the supporting surface for the vehicle, a support for the rear axle mounted to swing into and out of operative position, a stop for limiting the forward movement of the carriage, a connection between the carriage and the rear support for swinging the support into operative position when the carriage engages the stop, a movable inclined approach for engagement by the wheels of the vehicle to lift the axles into engagement with the supports, a stop for limiting the forward movement of the approach to a position with the highest portion thereof in register with the rear support, a spring normally acting to move the approach toward the stop, and releasable latch mechanism for holding the approach in said position, a connection between the latch mechanism and the rear support for operating the said mechanism to release the approach when the support moves into operative position, and normally active means for moving the rear support into inoperative position, the supports for the axle being extensible and contractible.

5. In combination, a carriage having supports for the front axle of the vehicle for supporting the wheels thereof out of contact with the supporting surface for the vehicle, a support for the rear axle mounted to swing into and out of operative position, a stop for limiting the forward movement of the carriage, a connection between the carriage and the rear support for swinging the support into operative position when the carriage engages the stop, a movable inclined approach for engagement by the wheels of the vehicle to lift the axles into engagement with the supports, a stop for limiting the forward movement of the approach to a position with the highest portion thereof in register with the rear support, a spring normally acting to move the approach toward the stop, and releasable latch mechanism for holding the approach in said position, and a connection between the latch mechanism and the rear support for operating the said mechanism to release the approach when the support moves into operative position.

6. In combination, a carriage having supports for the front axle of the vehicle for supporting the wheels thereof out of contact with the supporting surface for the vehicle, a support for the rear axle mounted to swing into and out of operative position, a stop for limiting the forward movement of the carriage, a connection between the carriage and the rear support for swinging the support into operative position when the carriage engages the stop, a movable inclined approach for engagement by the wheels of the vehicle to lift the axles into engagement with the supports, a stop for limiting the forward movement of the approach to a position with the highest portion thereof in register with the rear support, a spring normally acting to move the approach toward the stop, and releasable latch mechanism for holding the approach in said position.

7. In combination, a wheeled carriage having means for engaging the front axle of an automobile to support the wheels out of contact with the ground, a rear axle support hinged to swing into and out of operative positions, a connection between the carriage and the said support for moving the support into operative position when the carriage has been moved by the automobile far enough away from the rear axle support to bring the rear axle into position to be engaged by the said support, an approach for engagement by the wheels of the automobile to lift the axle on to the supports, means for holding the said approach normally in contact with the rear wheels when they are supported out of contact with the ground by the rear axle support, a latch for holding the approach in such position, and a connection between the latch and the rear support for releasing the latch when the rear support is in operative position.

WILKIE HORATIO HOLTBY.

Witnesses:
R. C. HOBBS,
H. A. JONES.